United States Patent
Bhamri et al.

(10) Patent No.: US 12,238,027 B2
(45) Date of Patent: Feb. 25, 2025

(54) TIMING-RELATED CONSIDERATIONS FOR NETWORK-CONTROLLED REPEATERS

(71) Applicant: Apple Inc., Cupertino, CA (US)

(72) Inventors: Ankit Bhamri, Bad Nauhem (DE); Hong He, San Jose, CA (US); Dawei Zhang, Saratoga, CA (US); Haitong Sun, Cupertino, CA (US); Oghenekome Oteri, San Diego, CA (US); Seyed Ali Akbar Fakoorian, San Diego, CA (US); Sigen Ye, San Diego, CA (US); Wei Zeng, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 316 days.

(21) Appl. No.: 17/810,909

(22) Filed: Jul. 6, 2022

(65) Prior Publication Data

US 2024/0014959 A1    Jan. 11, 2024

(51) Int. Cl.
*H04L 5/00* (2006.01)
*H04W 72/044* (2023.01)
*H04W 72/0446* (2023.01)

(52) U.S. Cl.
CPC .......... *H04L 5/0048* (2013.01); *H04L 5/0073* (2013.01); *H04W 72/0446* (2013.01); *H04W 72/046* (2013.01)

(58) Field of Classification Search
CPC ............ H04W 72/046; H04W 72/0446; H04L 5/0073; H04L 5/0048
USPC .......................................................... 370/329
See application file for complete search history.

(56) References Cited

U.S. PATENT DOCUMENTS

| | | | |
|---|---|---|---|
| 2020/0052843 A1* | 2/2020 | Cheng | H04W 76/14 |
| 2020/0053702 A1* | 2/2020 | Cheng | H04L 1/08 |
| 2022/0070855 A1* | 3/2022 | Zhang | H04W 72/51 |
| 2023/0119446 A1* | 4/2023 | Wang | H04W 72/20 370/329 |
| 2023/0262479 A1* | 8/2023 | Xue | H04W 72/046 370/329 |
| 2024/0048954 A1* | 2/2024 | Dutta | H04W 16/28 |

* cited by examiner

*Primary Examiner* — Peter G Solinsky
(74) *Attorney, Agent, or Firm* — Fay Kaplun & Marcin, LLP

(57) ABSTRACT

A repeater configured to receive, on a side control channel from a component of a network, side control information including parameters at least for determining time domain resources on which to apply an indicated beam for uplink (UL) transmission reception or downlink (DL) transmission forwarding with a user equipment (UE) on an access link, determine, from the received parameters, whether to apply the indicated beam to a transmission (Tx) spatial filter, a reception (Rx) spatial filter, or both the Tx and Rx spatial filters and apply the indicated beam to the determined Tx spatial filter, Rx spatial filter, or both the Tx and Rx spatial filters for the determined time domain resources when forwarding the DL transmission to the UE or receiving the UL transmission from the UE for forwarding to the network.

20 Claims, 9 Drawing Sheets

Network Arrangement 100

Timing Diagram 200

Timing Diagram
300

Timing Diagram
350

Timing Diagram
400

Timing Diagram
500

Timing Diagram
600

Timing Diagrams
650

TIMING-RELATED CONSIDERATIONS FOR NETWORK-CONTROLLED REPEATERS

BACKGROUND INFORMATION

A repeater can be deployed in a network to receive and forward transmissions from a network to a user equipment (UE) and/or from the UE to the network to improve the network coverage in low signal-to-noise ratio (SNR) regions, specifically for cell edge users. Typically, the repeater receives and forwards the transmissions without any processing of the transmissions at the repeater.

In 5G New Radio (NR), for higher frequency ranges (FR), e.g., FR2, the simple forwarding of transmissions at the repeater, without using any specific beam information, may not be beneficial. Therefore, it may be useful to consider repeaters that can be controlled by the network to direct the repeater transmit (Tx) beams to the UE and/or repeater receive (Rx) beams to receive from the UE. This beam steering functionality can further improve the network coverage, especially in FR2.

SUMMARY

Some exemplary embodiments are related to a processor of a repeater configured to receive, on a side control channel from a component of a network, side control information including parameters at least for determining time domain resources on which to apply an indicated beam for uplink (UL) transmission reception or downlink (DL) transmission forwarding with a user equipment (UE) on an access link, determine, from the received parameters, whether to apply the indicated beam to a transmission (Tx) spatial filter, a reception (Rx) spatial filter, or both the Tx and Rx spatial filters and apply the indicated beam to the determined Tx spatial filter, Rx spatial filter, or both the Tx and Rx spatial filters for the determined time domain resources when forwarding the DL transmission to the UE or receiving the UL transmission from the UE for forwarding to the network.

Other exemplary embodiments are related to a repeater having a transceiver configured to communicate with a user equipment (UE) and a network and a processor communicatively coupled to the transceiver and configured to receive, on a side control channel from a component of the network, side control information including parameters at least for determining time domain resources on which to apply an indicated beam for uplink (UL) transmission reception or downlink (DL) transmission forwarding with the UE on an access link, determine, from the received parameters, whether to apply the indicated beam to a transmission (Tx) spatial filter, a reception (Rx) spatial filter, or both the Tx and Rx spatial filters and apply the indicated beam to the determined Tx spatial filter, Rx spatial filter, or both the Tx and Rx spatial filters for the determined time domain resources when forwarding the DL transmission to the UE or receiving the UL transmission from the UE for forwarding to the network.

Still further exemplary embodiments are related to a processor of a repeater configured to receive, on a side control channel from a component of a network, side control information including parameters at least for determining first time domain resources on which to apply a first indicated beam and second time domain resources on which to apply a second indicated beam for uplink (UL) transmission reception or downlink (DL) transmission forwarding with a user equipment (UE) on an access link determine, from the received parameters, whether to apply the first or second indicated beams to a transmission (Tx) spatial filter, a reception (Rx) spatial filter, or both the Tx and Rx spatial filters and apply the first or second indicated beams to the determined Tx spatial filter, Rx spatial filter, or both the Tx and Rx spatial filters for the determined first or second time domain resources when forwarding the DL transmission to the UE or receiving the UL transmission from the UE for forwarding to the network.

Additional exemplary embodiments are related to a repeater having a transceiver configured to communicate with a user equipment (UE) and a network and a processor communicatively coupled to the transceiver and configured to receive, on a side control channel from a component of the network, side control information including parameters at least for determining first time domain resources on which to apply a first indicated beam and second time domain resources on which to apply a second indicated beam for uplink (UL) transmission reception or downlink (DL) transmission forwarding with the UE on an access link determine, from the received parameters, whether to apply the first or second indicated beams to a transmission (Tx) spatial filter, a reception (Rx) spatial filter, or both the Tx and Rx spatial filters and apply the first or second indicated beams to the determined Tx spatial filter, Rx spatial filter, or both the Tx and Rx spatial filters for the determined first or second time domain resources when forwarding the DL transmission to the UE or receiving the UL transmission from the UE for forwarding to the network.

DETAILED DESCRIPTION

Figure 1:
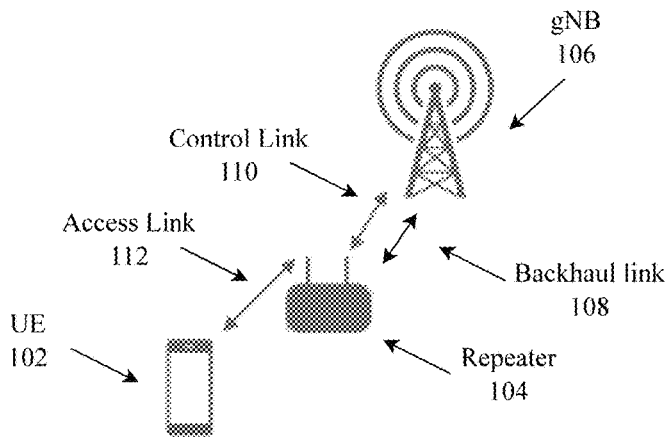
FIG. 1 shows a network arrangement including a UE, a repeater and a gNB according to various exemplary embodiments.

The exemplary embodiments may be further understood with reference to the following description and the related appended drawings, wherein like elements are provided with the same reference numerals. The exemplary embodiments relate to operations for network-controlled repeaters to direct the repeater transmit (Tx) beams to a user equipment (UE) and/or receive (Rx) beams from the UE. Specifically, to implement this beam steering functionality, the exemplary embodiments describe operations for providing timing alignment information to the repeater so that the repeater can update its Tx and/or Rx spatial filter parameters in dependence thereon.

The exemplary embodiments are described with regard to a UE. However, the use of a UE is merely provided for illustrative purposes. The exemplary embodiments may be utilized with any electronic component that is configured with the hardware, software, and/or firmware to exchange information (e.g., control information) and/or data with the network. Therefore, the UE as described herein is used to represent any suitable electronic device.

The exemplary embodiments are also described with regard to a 5G New Radio (NR) radio access network (RAN). However, reference to a 5G NR RAN is merely provided for illustrative purposes. The exemplary embodiments may be utilized with any network implementing a network topology comprising repeaters similar to those described herein. Therefore, the 5G NR network as described herein may represent any type of network implementing similar functionalities as the 5G NR network.

The exemplary embodiments are also described with regard to a repeater. Typically, a repeater (e.g., RF repeater) is deployed in a network to receive and forward transmissions to/from the network from/to a user equipment (UE) without any processing of the transmissions at the repeater. This can be beneficial to improve the network coverage in low signal-to-noise ratio (SNR) regions, specifically for cell edge users. In 5G NR, for higher frequency ranges (FR), e.g., FR2 (including FR2-1 (up to 52.6 GHz) or FR2-2 (above 52.6 GHz)), the simple forwarding of transmissions at the repeater, without using any specific beam information, may not be beneficial. Therefore, it may be useful to consider repeaters that can be controlled by the network to direct the repeater transmit (Tx) beams to the UE and/or receive (Rx) beams from the UE. This beam steering functionality can further improve the coverage, especially in FR2.

However, to implement beam steering, the repeaters would require control information, e.g., side control information, from the network to know when and where to direct its Tx and Rx spatial filters (beams). Considering the above, it becomes extremely critical for repeaters to have accurate timing alignment information to update its Tx and/or Rx spatial filter. This includes timing information for determining when to transmit to UEs and receive from UEs; for determining the switch from one Tx beam to another Tx beam for forwarding to UE or network; and for switching from Tx beam to Rx beam and vice versa.

In addition to the timing information to align the transmission/reception boundaries of the network-controlled repeater, the repeater can be provided with side control information including beamforming information, UL-DL TDD configuration information, ON-OFF information for efficient interference management and improved energy efficiency, and power control information.

According to various exemplary embodiments described herein, issues related to timing aspects for network-controlled repeaters are considered. Specifically, the exemplary embodiments address the alignment of Tx, Rx and forwarding boundaries at the repeater in consideration of the UL-DL TDD configuration and, potentially, different numerologies between the network-repeater link and the repeater-UE link. Additionally, the exemplary embodiments describe operations for handling beams associated with time domain resources for the repeater-UE link.

FIG. 1 shows a network arrangement 100 including a UE 102, a repeater 104 and a gNB 106 according to various exemplary embodiments. The repeater 104 is network-controlled via the gNB 106 to receive and forward downlink (DL) transmissions from the gNB 106 to the UE 102 and to receive and forward uplink (UL) transmissions from the UE 102 to the gNB 106. Two logical links 108, 100 between the gNB 106 and the repeater 104 correspond to a backhaul link 108 for sending/forwarding signals/channels and a control link 110 for exchanging side control information on a side control channel. The radio link 112 between the repeater 104 and the UE 102 may be referred to as an access link 112. On the access link 112, the repeater 104 can transmit DL signals/channels, e.g., PDCCH, PDSCH, CSI-RS, etc., from the gNB 106 to the UE 102 and receive UL signals/channels, e.g., PUCCH, PUSCH, SRS, etc., from the UE 102 for forwarding to the gNB 106. On the backhaul link 108, the repeater 104 can transmit the UL signals/channels received from the UE 102 to the gNB 106 and receive the DL signals/channels from the gNB 106 for forwarding to the UE 102.

According to various exemplary embodiments described herein, a repeater is configured with one or more sets of time domain resource parameters to determine timing information for Tx and/or Rx beams at the repeater for the UE-repeater access link.

According to a first exemplary embodiment, a repeater is indicated and/or configured by the network with time domain resource parameters, including, at least: a first slot offset (SlotOffset) relative to the slot n in which the side control information is received; a first starting symbol within a determined slot; and a first duration in terms of symbols and/or slots. For the indicated/configured time resources, a given set of parameters indicated/configured for the access link between the repeater and UE, e.g., numerology, beam forming parameters, etc., can be applied. The indicated parameters can be applied to either one or both of the Tx spatial filter for transmission to the UE on the access link and/or the Rx spatial filter for reception from the UE on the access link.

In one aspect of the first embodiment, the starting symbol within the determined slot and the duration are determined according to $$\left| n \cdot \frac{2\mu_1}{2\mu_2} \right| + SlotOffset,$$

where n is the slot index where side control information is received by the repeater, the first numerology $\mu_1$ is applied for the backhaul link between the gNB and repeater for a given cell, and the second numerology $\mu_2$ is applied for the access link between the repeater and UE for a given cell. In some scenarios, the first and second numerologies are expected to have a same value. In other scenarios, the first and second numerologies can have different values.

Figure 2:
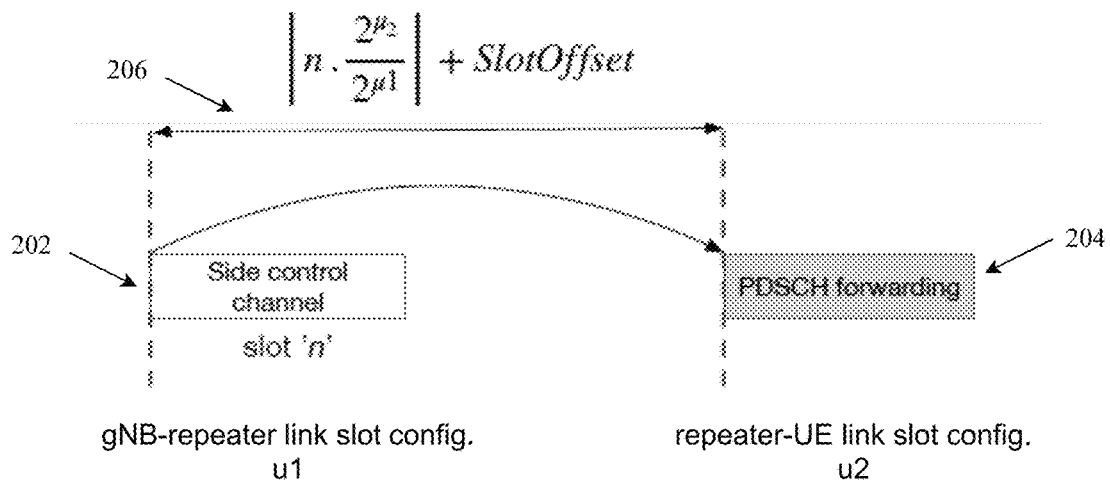
FIG. 2 shows an exemplary timing diagram for a repeater including a side control channel indicating side control information time domain resources for DL transmission (forwarding) of a PDSCH to a UE according to one example.

FIG. 2 shows an exemplary timing diagram 200 for a repeater including a side control channel 202 indicating side control information including time domain resources for DL transmission (forwarding) of a PDSCH 204 to a UE according to one example. Although a PDSCH 204 is shown in FIG. 2, the indicated time domain resources can be used for any type of DL or UL signal/channel, to be explained in further detail below. The side control channel 202 is received in slot n and carries time domain resource parameters at least including: a slot offset 206 (SlotOffset) to determine a slot to transmit the PDSCH 204; a starting symbol within the determined slot, to be described further below; and a duration for the PDSCH 204 transmission. The slot offset 206 can be any number of slots, e.g., 1 or 2. In some embodiments, the slot offset 206 can be 0 slots when intra-slot scheduling is enabled. A first numerology $\mu_1$ is applied for the gNB-repeater backhaul link.

In addition to the time domain resource parameters, the repeater is configured/indicated with a second numerology $\mu_2$ for the repeater-UE access link; a static and/or semi-static/dynamic TDD configuration for which the time domain resource parameters are applied; and a beam forming indication for the access link. For example, the beam forming indication can comprise a TCI state indicating the beam for the access link. However, other beam forming indications may also be used.

Based on the above described configuration, the repeater can determine the exact starting location to apply the indicated beam; the duration of the indicated beam; and the direction for which the indicated beam is applied. In other words, from the above network configuration parameters, the repeater determines parameters for either one or both of the Tx spatial filter for forwarding on the DL to the UE or the Rx spatial filter for receiving on the UL from the UE.

To determine whether to apply the indicated beam to the Tx spatial filter, the Rx spatial filter, or both the Tx and Rx spatial filters for the repeater-UE (access) link, various options are available.

In one option, the repeater receives a configuration/indication from the network of whether to apply the indicated beam for the Tx spatial filter, the Rx spatial filter, or both the Tx and Rx spatial filters for the repeater-UE access link. In one example, a two-bit code-point in the side control information format can indicate the above, for example, codepoint '00' indicates the beam is applied for the Tx spatial filter, '01' indicates the beam is applied for the Rx spatial filter, and '10' indicates the beam is applied for both the Tx and Rx spatial filters. In another example, a reserved value '11' of the above code-point can be used for other purposes. For example, the codepoint '11' can be used to dynamically indicate the spatial filter (beam) for the gNB/TRP-repeater (backhaul) link.

In the examples provided above, the beam parameters indicate the direction of the beam but are not limited to a specific channel or signal. In other words, each of the codepoints can be associated with multiple channels. For example, if '00' is indicated to the repeater for the Tx spatial filter, the repeater can use the same beam to forward PDSCH, PDCCH, or RS such as CSI-RS to the UE. In another example, if '01' is indicated to the repeater for the Rx spatial filter, the repeater can use the same beam to receive PUSCH, PUCCH, or RS such as SRS from the UE.

Figure 3A:
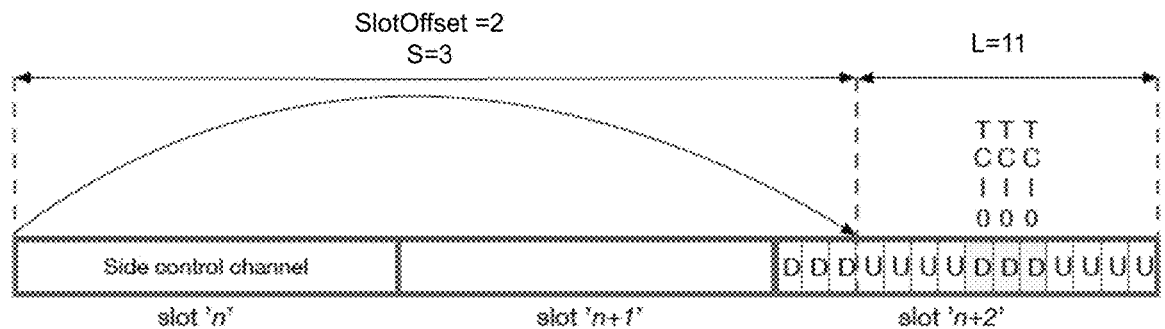
FIG. 3a shows an exemplary timing diagram for a repeater including a side control channel indicating side control information including time domain resources and spatial filter (beam) parameters according to one example.

FIG. 3a shows an exemplary timing diagram 300 for a repeater including a side control channel indicating side control information including time domain resources and spatial filter (beam) parameters according to one example. The side control channel is received in slot n and carries parameters at least including: a slot offset (SlotOffset) to determine the access link Tx/Rx slot relative to the slot n; a starting symbol (S) within the determined slot; a duration (L); a numerology $\mu_2$ for the access link; a beam indication (e.g., TCI state) for the access link; a UL-DL TDD configuration; and an indication of applying the beam to Rx, Tx or both spatial filters. In this example, a slot comprises 14 symbols (symbols 0-13).

In this example, SlotOffset=2, starting symbol S=3, duration L=11, $\mu_2=\mu_1$, and the TCI state=0. The UL-DL TDD pattern for the determined slot is three DL symbols (symbols 0-2), followed by four UL symbols (symbols 3-6), followed by three DL symbols (symbols 7-9), followed by four UL symbols (symbols 10-13). Those skilled in the art will ascertain that different UL-DL TDD patterns can be configured for the access link. Additionally, in this example, the side control channel indicates the Tx spatial filter for DL transmissions on the access link, e.g., by indicating codepoint '01'. Thus, the beam is applied only to DL signals/channels for the duration.

Based on the configured parameters, the starting symbol for the indicated beam is the fourth symbol of slot n+2 (symbol 3). According to the UL-DL TDD pattern, symbols 0-2 and 7-9 are used for DL signals/channels and symbols 3-6 and 10-13 are used for UL signals/channels. The beam is not applied to UL symbols, based on the indication of the Tx spatial filter only. The beam is not applied to DL symbols 0-2, which occur prior to the starting symbol, or to UL symbols 3-6, 10-13, which are assumed to be vacant. Thus, the beam (TCI state 0) is applied only to symbols 7-9, which are used for DL signals/channels in this TDD pattern and are within the determined duration L.

In another option, the repeater implicitly determines whether the indicated beam is to be applied for the Tx spatial filter or for the Rx spatial filter for the access link, without any dedicated indication from the network. In one embodiment, the repeater first determines the starting slot, the starting symbol within the determined slot, and the TDD pattern from the indicated/configured parameters. If the starting symbol is configured as a DL symbol, based on the TDD configuration, the repeater can assume that the indicated beam is to be applied for the Tx spatial filter (Tx beam) for forwarding a DL channel/signal to the UE from the repeater. If the starting symbol is configured as a UL symbol based on the TDD configuration, the repeater can assume that the indicated beam is to be applied for the Rx spatial filter (Rx beam) for receiving an UL channel/signal from the UE.

Upon determining the beam direction for the access link, the repeater is expected to use the same beam for all the symbols in the determined direction. When the DL direction is determined, the same Tx spatial filter is applied for all the DL symbols over the indicated duration. When the UL direction is determined, the same Rx spatial filter is applied for all the UL symbols over the indicated duration. The beam is not applied for symbols in the opposing direction during the indicated duration.

Figure 3B:
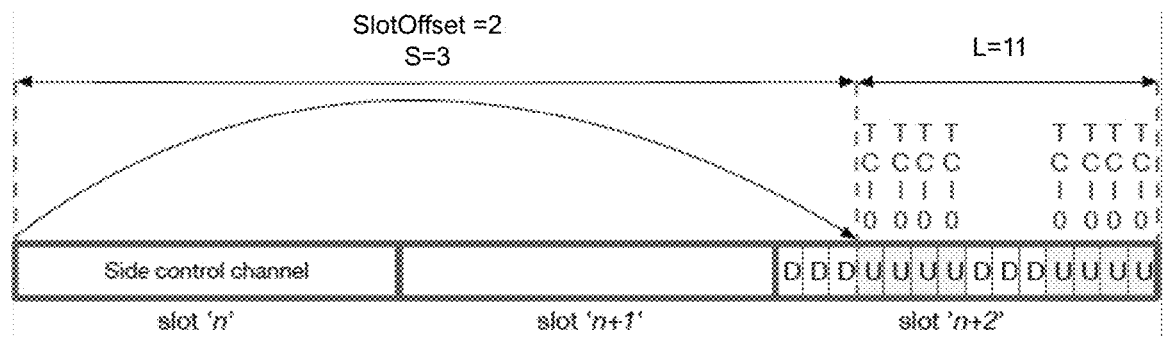
FIG. 3b shows an exemplary timing diagram for a repeater including a side control channel indicating side control information including time domain resources and spatial filter (beam) parameters according to one example.

FIG. 3b shows an exemplary timing diagram 350 for a repeater including a side control channel indicating side control information including time domain resources and spatial filter (beam) parameters according to one example. The side control channel is received in slot n and carries parameters similar to those described above for the timing diagram 300 of FIG. 3a. However, in this example, the side control channel does not indicate a Tx/Rx spatial filter.

Based on the configured parameters, the starting symbol for the indicated beam is the fourth symbol (symbol 3) of slot n+2. Similar to above, the starting symbol is used for UL signals/channels in this TDD pattern. Thus, from the starting symbol, the repeater determines to apply the beam parameters to the Rx spatial filter for the duration. Symbols 3-6 and 10-13 are used for UL signals/channels in this TDD pattern. Thus, the beam (TCI state 0) is applied only to symbols 3-6 and 10-13. Symbols 7-9, used for DL signals/channels in this TDD pattern within the duration L, are assumed to be vacant and the beam is not applied.

According to another aspect of the first exemplary embodiment, a repeater can indicate one or more beam forming capabilities. One example capability can indicate whether the repeater can apply the same spatial filter for both Tx/Rx on the access link, e.g., beam correspondence. If this capability is indicated by the repeater, according to one embodiment, the repeater can assume to apply the same beam for both DL and UL (Tx and Rx spatial filters) when no specific indication of DL or UL is received from the network.

In still another aspect of the first exemplary embodiment, the time resource set and corresponding TCI state (beam) indication can be jointly signaled by a single code point. For example, a TDRA table can be extended to include timing resources as well as a corresponding TCI state. In another example, the time resource set and corresponding TCI (beam) indication can be separately indicated, for example, by a TDRA table and a TCI table, respectively.

Figure 10:
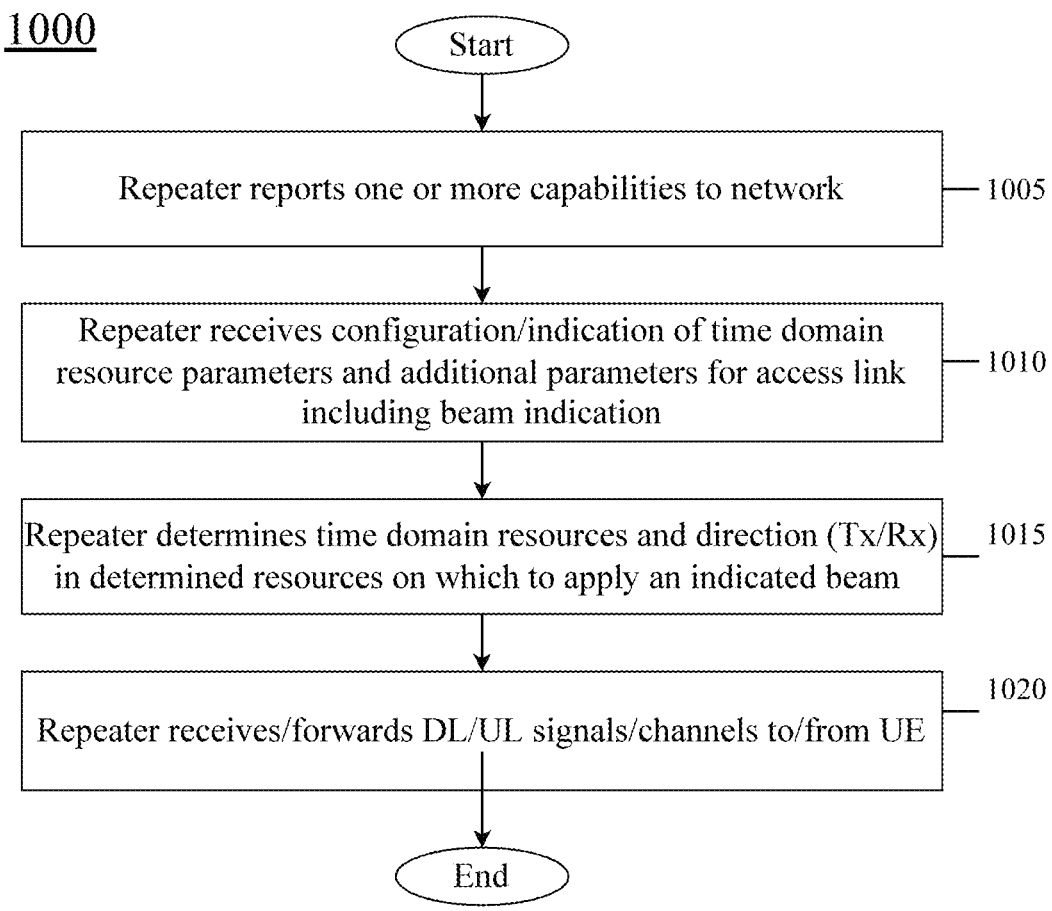
FIG. 10 shows an exemplary method for a repeater determining time domain resources on which to apply an indicated beam for access link communications with a UE according to various exemplary embodiments.

FIG. 10 shows an exemplary method 1000 for a repeater determining time domain resources on which to apply an indicated beam for access link communications with a UE according to various exemplary embodiments.

In 1005, the repeater may report one or more capabilities related to beam forming capabilities on the access link. The capabilities can include, e.g., support of beam correspondence wherein the repeater can apply the same spatial filter for both Tx and Rx on the access link. The capabilities can further include, e.g., whether a time offset is required for receiving and forwarding, whether a time offset is required for switching between forwarding and receiving, or whether a time offset is required to switch beams, to be described in greater detail below.

In 1010, the repeater receives a configuration and/or indication of time domain resource parameters and additional parameters for access link Tx/Rx with the UE. The repeater receives the configuration/indication on the side control channel of a control link with a gNB/TRP. The time domain resource parameters can include a slot offset, a starting symbol and a duration for applying an indicated beam. The additional parameters can include a UL-DL TDD pattern, beam forming parameters, and a numerology for the access link. In some embodiments, an indication of Tx and/or Rx spatial filter can be included in the configuration parameters. In some embodiments, the time domain resource set and the beam indication (TCI state) can be jointly signaled.

In 1015, the repeater determines the time domain resources to which the indicated beam is applied. The symbols to which the beam is applied may be determined based on the UL-DL TDD pattern and the direction (Tx/Rx/both), as described above. The repeater determines which direction to apply the beams in the determined time domain resources i.e., Tx beams (for forwarding DL) and/or Rx beams (for receiving UL).

In 1020, the repeater receives and forwards the DL/UL signals/channels to/from the UE on the access link according to the determined time domain resources and indicated beam.

According to a second exemplary embodiment, a repeater is configured/indicated with two sets of configurations for a given cell, where the first set of configuration includes a first numerology $\mu_1$ and a first UL-DL TDD configuration and the second set of configuration includes a second numerology $\mu_2$ and a second UL-DL TDD configuration. Similar to above, the first numerology $\mu_1$ is applied for the backhaul link between the gNB and repeater for a given cell, and the second numerology $\mu_2$ is applied for the access link between the repeater and UE for a given cell. The first UL-DL TDD configuration for the backhaul link is a static configuration for a given cell and the second UL-DL TDD configuration for the access link is a semi-static or dynamic configuration that can override the first UL-DL TDD configuration for a given cell.

Figure 4:
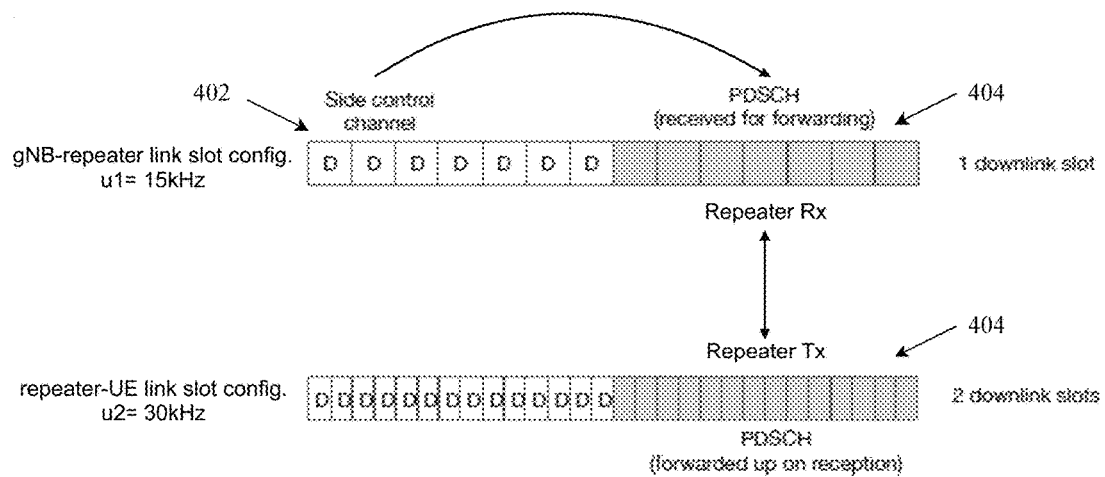
FIG. 4 shows an exemplary timing diagram for a repeater including a side control channel indicating side control information including time domain resources for DL transmission (forwarding) of a PDSCH to a UE, wherein the repeater-UE access link has a numerology different from the gNB-repeater backhaul link, according to one example.

FIG. 4 shows an exemplary timing diagram 400 for a repeater including a side control channel 402 indicating side control information including time domain resources for DL transmission (forwarding) of a PDSCH 404 to a UE, wherein the repeater-UE access link has a numerology different from the gNB-repeater backhaul link, according to one example. Similar to the timing diagram 200 of FIG. 2, although a PDSCH 404 is shown in FIG. 4, the indicated time domain resources can be used for any type of DL or UL signal/channel. A first numerology $\mu_1$ is applied for the gNB-repeater backhaul link and a second numerology $\mu_2$ is applied for the repeater-UE access link. In this example, $\mu_1$=15 kHz and $\mu_2$=30 kHz.

As shown in FIG. 4, the PDSCH 404 is received at the repeater on the backhaul link across one downlink slot (7 symbols) having the first numerology $\mu_1$=15 kHz. The PDSCH 404 is forwarded upon reception at the repeater on the access link to the UE across two downlink slots (14 symbols) having the second numerology $\mu_2$=30 kHz.

In one aspect of the second embodiment, the repeater is not explicitly configured/indicated with the second numerology $\mu_2$ for the access link, and the repeater can assume that the second numerology $\mu_2$ is equivalent to the first numerology $\mu_1$. That is, the same numerology can be applied for both links and indicated only once. In scenarios where the DL and/or UL BWP for the UE is associated with a numerology different than the first numerology, the network can configure/indicate the second numerology.

In another aspect of the second embodiment, the first numerology $\mu_1$ can be a reference numerology that is smaller than or equal to the second numerology $\mu_2$, wherein the first or the second UL-DL TDD configuration is applied according to the reference numerology at the repeater. When the first and second numerologies are different, then UL, DL, and flexible symbols for the backhaul link between gNB and repeater corresponds to $2^{\mu_2-\mu_1}$ times the symbols for the access link between repeater and UE.

According to the second exemplary embodiment, a repeater is configured/indicated with: a numerology $\mu_2$ for the access link (repeater-UE link), either explicitly or implicitly as described above; more than one set of time domain resource parameters each including a slot offset, a starting symbol, and a duration; a static and/or semi-static/dynamic UL-DL TDD configuration for which the time domain resource parameters are applied on the access link; and more than one beam indication for the access link, e.g., more than one TCI state indicating multiple beams for the access link.

Based on the above configuration, the repeater can determine multiple time domain resources and corresponding indicated beams to apply to each of the multiple time domain resources. For each of the time domain resources, the repeater can determine the exact starting location to apply the corresponding indicated beam, the duration of the indicated beam and the direction for which the indicated beam is applied, e.g., either for the repeater Tx spatial filter for forwarding to the UE or repeater Rx spatial filter for receiving from the UE, or for both the Tx and Rx spatial filters. As described above, multiple different UL-DL TDD patterns can be configured, and the TDD pattern and numerology $\mu_1$ for the backhaul link may be different from the TDD pattern and numerology $\mu_2$ for the access link.

By extending the aspects described in the first exemplary embodiment, the direction (Tx and/or Rx) for each of the time domain resources can be determined either by explicit indication, e.g., in a codepoint, or implicitly based on the direction of the starting symbol for each time domain resource, as described above. In one aspect, a single table can be used to indicate (either explicitly or implicitly) multiple sets of time domain resource parameters (slot offset, starting symbol, duration).

In some aspects, a first slot offset of a first set of time domain resource parameters is relative to the slot carrying the side control information, while a second slot offset of a second set of time domain resource parameters is relative to the last slot of the (indicated) previous time domain resource. In other aspects, each of the slot offsets is relative to the slot carrying the side control information. In still other aspects, the beam (e.g., TCI state) is indicated jointly for each of the indicated time domain resource parameter sets.

In one example implementation of the second embodiment, the repeater is configured with two sets of time domain resource parameters and a corresponding two TCI states (beams), where the two time domain resources are expected to be non-overlapping. The two time domain resources are expected to occur in sequential manner, and the direction of transmission for each of the non-overlapping time resources can be either DL or UL. The repeater can either apply the indicated beam for Tx spatial filter in all the DL symbols within a duration or apply the indicated beam for Rx spatial filter in all the UL symbols within a duration for the repeater-UE access link. The determination/indication of the DL/UL direction can be performed similarly as described above in the first exemplary embodiment.

Figure 5:
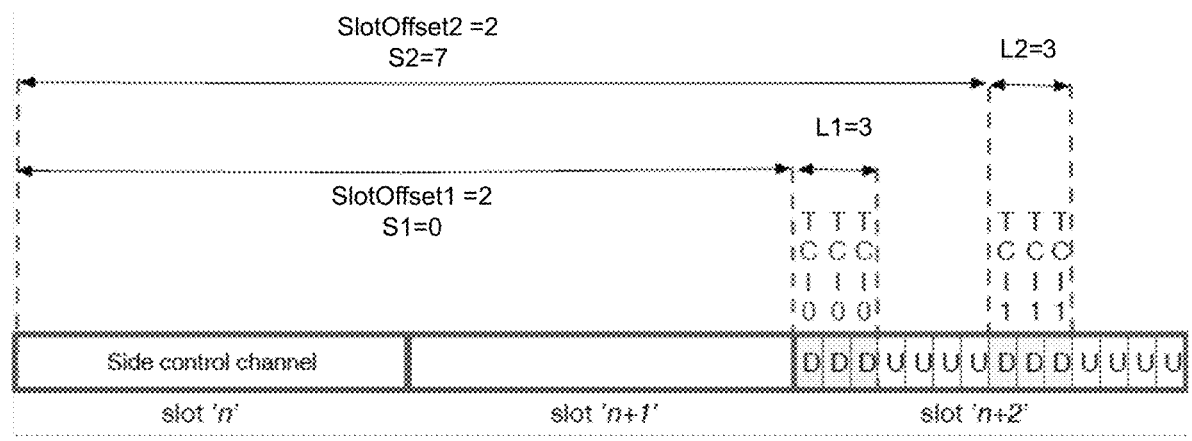
FIG. 5 shows an exemplary timing diagram for a repeater including a side control channel indicating side control information including two sets of non-overlapping time domain resources and corresponding spatial filter (beam) parameters according to one example.

FIG. 5 shows an exemplary timing diagram 500 for a repeater including a side control channel indicating side control information including two sets of non-overlapping time domain resources and corresponding spatial filter (beam) parameters according to one example. The side control channel is received in slot n and carries two sets of parameters, each set of parameters at least including: a slot offset (SlotOffset) to determine the access link Tx/Rx slot relative to the slot n; a starting symbol (S) within the determined slot; a duration (L); a beam indication (e.g., TCI state) for the access link; and an indication of applying the beam to Rx, Tx or both spatial filters. The parameters can additionally include a numerology $\mu_2$ for the access link; and a UL-DL TDD configuration. As described above, the numerology $\mu_2$ for the access link can be indicated/configured explicitly or can be determined implicitly. In this example, a slot comprises 14 symbols (symbols 0-13).

In this example, for the first set of parameters, SlotOffset1=2, starting symbol S1=0, duration L1=3, and the first TCI state=0. For the second set of parameters, SlotOffset2=2, starting symbol S2=7, duration L2=3, and the second TCI state=1. The two sets of time domain resources are expected to be non-overlapping. The UL-DL TDD pattern for the determined slot is three DL symbols (symbols 0-2), followed by four UL symbols (symbols 3-6), followed by three DL symbols (symbols 7-9), followed by four UL symbols (symbols 10-13). Those skilled in the art will ascertain that different UL-DL TDD patterns can be configured for the access link. Additionally, in this example, the side control channel indicates, for both sets of parameters, the Tx spatial filter for DL transmissions on the access link, e.g., by indicating codepoint '01'. Thus, the beam is applied only to DL signals/channels for each of the durations. Alternatively, as described above, the Tx spatial filter can be determined implicitly from the starting symbol for each of the time domain resource sets, which is, in this example, a DL symbol for each of the sets.

Based on the configured parameters, the starting symbol for the indicated beam of the first set of parameters is the first symbol of slot n+2 (symbol 0) and the duration L1=3. The beam (TCI state=0) is applied to DL symbols 0-2. The starting symbol for the indicated beam of the second set of parameters is the eighth symbol of slot n+2 (symbol 7) and the duration L2=3. The beam (TCI state=1) is applied to DL symbols 7-9. The beam(s) are not applied to UL symbols 3-6 or 10-13, which are assumed to be vacant.

The example implementation described above could be beneficial in scenarios where, for example, a PDCCH is forwarded to the UE on first DL time resources with a first beam and the corresponding PDSCH scheduled by the PDCCH is forwarded on the second DL time resources with a second beam. It should be understood by those skilled in the art that other types of signals/channels can be transmitted in a similar manner, including other DL signals/channels and UL signals/channels.

In another example implementation of the second embodiment, the repeater is configured with two sets of time domain resource parameters and a corresponding two TCI states (beams), where the two time domain resources can be partially or fully overlapping. The two time domain resources can occur simultaneously, and the direction of transmission for each of the time resources can be either DL or UL. In other words, for each set of resources, the repeater can either apply the indicated beam for the Tx spatial filter in all the DL symbols within a duration or apply the indicated beam for the Rx spatial filter in all the UL symbols within a duration for the repeater-UE access link. The determination of the DL or UL direction can be performed similarly as described previously.

This example implementation can be beneficial in scenarios when, within the given slots/durations, the repeater is scheduled to forward transmissions on the DL symbols and receive transmissions on the UL symbols. This may occur when the repeater is capable of simultaneous transmission or simultaneous reception using different beams for the access link.

Figure 6A:
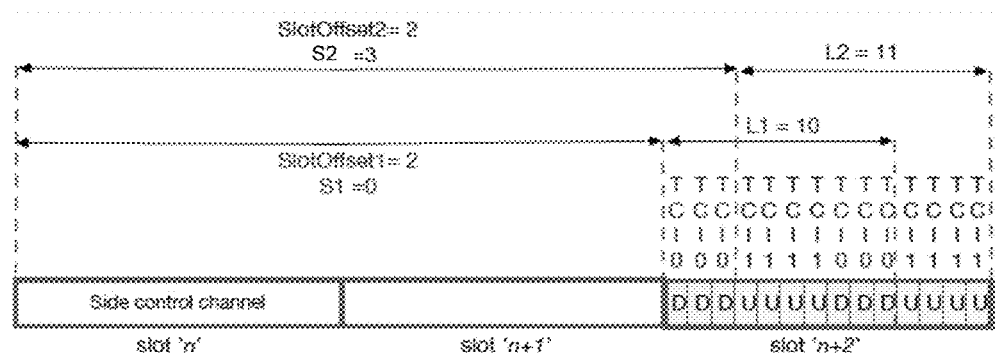
FIG. 6a shows an exemplary timing diagram for a repeater including a side control channel indicating side control information including two sets of partially overlapping time domain resources and corresponding spatial filter (beam) parameters according to one example.

FIG. 6a shows an exemplary timing diagram 600 for a repeater including a side control channel indicating side control information including two sets of partially overlapping time domain resources and corresponding spatial filter (beam) parameters according to one example. The side control channel is received in slot n and carries parameters similar to those described above with regard to the timing diagram 500 of FIG. 5, including two sets of: a slot offset (SlotOffset); a starting symbol (S); a duration (L); a beam indication (e.g., TCI state) for the access link; and an indication of applying the beam to Rx, Tx or both spatial filters. The parameters can additionally include a numerology $\mu_2$ for the access link; and a UL-DL TDD configuration. In this example, a slot comprises 14 symbols (symbols 0-13).

In this example, for the first set of parameters, SlotOffset1=2, starting symbol S1=0, duration L1=10, and the first TCI state=0. For the second set of parameters, SlotOffset2=2, starting symbol S2=3, duration L2=11, and the second TCI state=1. The two sets of time domain resources are partially overlapping. The UL-DL TDD pattern for the determined slot is three DL symbols (symbols 0-2), followed by four UL symbols (symbols 3-6), followed by three DL symbols (symbols 7-9), followed by four UL symbols (symbols 10-13). Additionally, in this example, the side control information indicates, for the first set of parameters, the Tx spatial filter for DL transmissions on the access link, e.g., by indicating codepoint '01'. Thus, the first beam is applied only to DL signals/channels for the first duration. For the second set of parameters, the side control information indicates the Rx spatial filter for UL transmissions on the access link, e.g., by indicating codepoint '00'. Thus, the second beam is applied only to UL signals/channels for the second duration. Alternatively, as described above, the Tx/Rx spatial filter can be determined implicitly from the starting symbol for each of the time domain resource sets.

Based on the configured parameters, the starting symbol for the indicated beam of the first set of parameters is the first symbol of slot n+2 (symbol 0) and the duration L1=10. The beam (TCI state=0) is applied to DL symbols 0-2 and 7-9. The starting symbol for the indicated beam of the second set of parameters is the fourth symbol of slot n+2 (symbol 3) and the duration L2=11. The beam (TCI state=1) is applied to UL symbols 3-6 and 10-13.

Figure 6B:
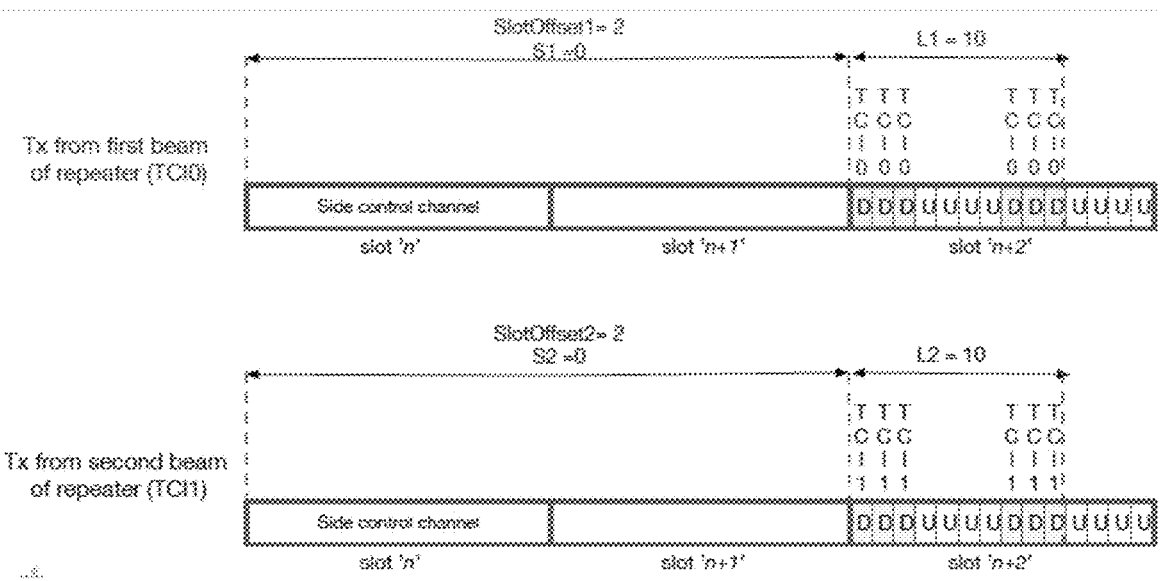
FIG. 6b shows exemplary timing diagrams for a repeater including a side control channel indicating side control information including two sets of partially or fully overlapping time domain resources and corresponding spatial filter (beam) parameters according to one example.

FIG. 6b shows exemplary timing diagrams 650 for a repeater including a side control channel indicating side control information including two sets of partially or fully overlapping time domain resources and corresponding spatial filter (beam) parameters according to one example. The side control channel is received in slot n and carries parameters similar to those described above with regard to the timing diagram 600 of FIG. 6, including two sets of: a slot offset (SlotOffset); a starting symbol (S); a duration (L); a beam indication (e.g., TCI state) for the access link; and an indication of applying the beam to Rx, Tx or both spatial filters. The parameters can additionally include a numerology $\mu_2$ for the access link; and a UL-DL TDD configuration. In this example, a slot comprises 14 symbols (symbols 0-13).

In this example, for the first set of parameters, SlotOffset1=2, starting symbol S1=0, duration L1=10, and the first TCI state=0. For the second set of parameters, SlotOffset2=2, starting symbol S2=0, duration L2=10, and the second TCI state=1. The two sets of time domain resources are fully overlapping. The UL-DL TDD pattern for the determined slot is three DL symbols (symbols 0-2), followed by four UL symbols (symbols 3-6), followed by three DL symbols (symbols 7-9), followed by four UL symbols (symbols 10-13). Additionally, in this example, the side control information indicates, for both sets of parameters, the Tx spatial filter for DL transmissions on the access link, e.g., by indicating codepoint '01'. Thus, the first beam is applied only to DL signals/channels for each of the durations. Alternatively, as described above, the Tx/Rx spatial filter can be determined implicitly from the starting symbol for each of the time domain resource sets.

Based on the configured parameters, the starting symbol for the indicated beam of the first and second sets of parameters is the first symbol of slot n+2 (symbol 0) and the duration L1=10. The beam (TCI state=0) is applied to DL symbols 0-2 and 7-9. The starting symbol for the indicated beam of the second set of parameters is the fourth symbol of slot n+2 (symbol 3) and the duration L2=11. The beam (TCI state=1) is also applied to DL symbols 0-2 and 7-9.

Thus, in this example, two simultaneous DL transmissions are scheduled on two fully overlapping resources using a first Tx beam and a second Tx beam. It should be understood that this capability is supported only by certain repeaters, e.g., repeaters having two panels.

In some aspects of the second exemplary embodiment, the repeater can be configured with one set of time domain resource parameters, but multiple set of TCI states (beams), wherein the repeater can assume that it is required to either simultaneously receive multiple UL transmissions from the UE on the multiple indicated beams or simultaneously transmit multiple DL transmissions to UE on the multiple indicated beams. In one example, the repeater can indicate its capability whether it supports the simultaneous transmission/reception to/from the UE on multiple beams and, if such capability is supported by repeater, then the above implementation can be configured for the repeater.

Figure 11:
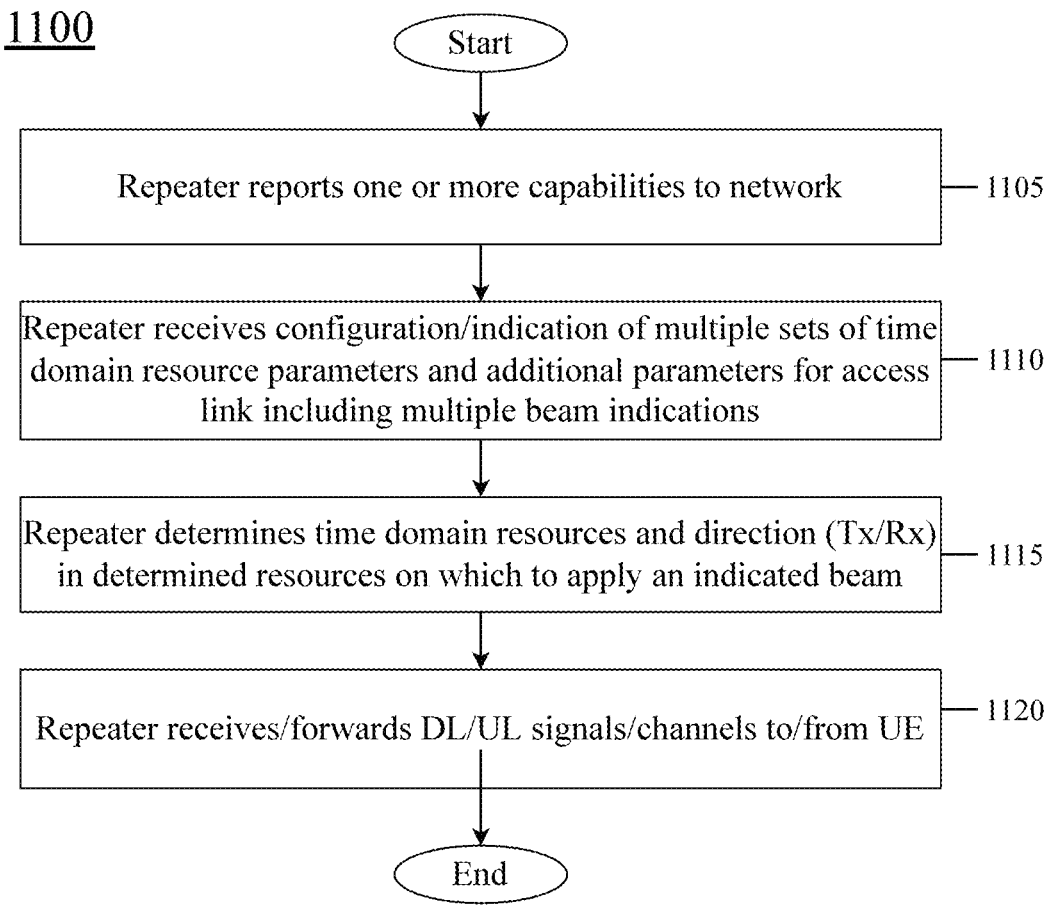
FIG. 11 shows an exemplary method for a repeater determining time domain resources on which to apply an indicated beam for access link communications with a UE according to various exemplary embodiments.

FIG. 11 shows an exemplary method 1100 for a repeater determining time domain resources on which to apply an indicated beam for access link communications with a UE according to various exemplary embodiments.

In 1105, the repeater may report one or more capabilities related to beam forming capabilities on the access link. The capabilities can include, e.g., support of simultaneous Tx/Rx on the access link using multiple beams. The capabilities can further include, e.g., whether a time offset is required for receiving and forwarding, whether a time offset is required for switching between forwarding and receiving, or whether a time offset is required to switch beams, to be described in greater detail below.

In 1110, the repeater receives a configuration and/or indication of multiple sets of time domain resource parameters and additional parameters for access link Tx/Rx with the UE. The repeater receives the configuration/indication on the side control channel of a control link with a gNB/TRP. The respective time domain resource parameters can include a slot offset, a starting symbol and a duration for applying an indicated beam. The additional parameters can include a first UL-DL TDD pattern and a first numerology for the backhaul link and a second UL-DL TDD pattern and a second numerology for the access link. The additional parameters can further include respective beam forming parameters for each of the sets of time domain resources. In some embodiments, an indication of Tx and/or Rx spatial filter can be included in the configuration parameters. In some embodiments, the time domain resource set and the beam indication (TCI state) can be jointly signaled. In some embodiments, the respective time domain resources can be non-overlapping, partially overlapping or fully overlapping.

In 1115, the repeater determines the time domain resources to which the indicated beams are applied. The symbols to which the beam is applied may be determined based on the UL-DL TDD pattern and the direction (Tx/Rx/both), as described above. The repeater determines which direction to apply the beams in the determined time domain resources i.e., Tx beams (for forwarding DL) and/or Rx beams (for receiving UL).

In 1120, the repeater receives and forwards the DL/UL signals/channels to/from the UE on the access link according to the determined time domain resources and indicated beam.

In some aspects of the first and second exemplary embodiments, a repeater may indicate additional capabilities including: whether a gap or time offset is required by the repeater for the receive and forward procedure; whether a gap or time offset is required by the repeater to switch between forwarding to a UE and receiving from a UE; and/or whether a gap or time offset is required by the repeater to switch from one beam to another beam, where both beams are indicated for same direction. In some scenarios, a repeater can be serving multiple UEs and may be required to forward to one UE one symbol and receive from another UE on the following symbol. If one or more of the above capabilities are reported by the repeater, then the repeater is expected to receive time resource parameters that comply with the reported capabilities.

In some embodiments, the network may indicate more than one numerology for the repeater-UE access links that correspond to potentially different UEs, where the repeater may apply one reference numerology to determine time domain resources and corresponding beams, and the reference numerology equals the maximum value from all the indicated numerologies for the repeater-UE access links.

In some embodiments, in addition to the time resource indication as described in the first and second exemplary embodiments, an additional time offset value can be indicated to the repeater based on reported capabilities.

In some embodiments, the time domain resources indicated by network to repeater can be periodic or semi-persistent.

In some embodiments, the time domain resources indicated by network to repeater can be utilized to indicate when and for how long to turn ON or OFF repeater-UE link and/or network-repeater link including either and/or the Tx/Rx chains. In some embodiments, the time domain resources indicated by network to repeater can be utilized to indicate when and for how long the BWP is activated or to allow switching from one BWP to another BWP. In some embodiments, the time domain resources indicated by network to repeater can be utilized to determine when to apply corresponding Tx and/or Rx beam (TCI State) for transmitting and/or receiving to/from network side, i.e., determine if and when to update repeater beams for the backhaul side.

Figure 7:
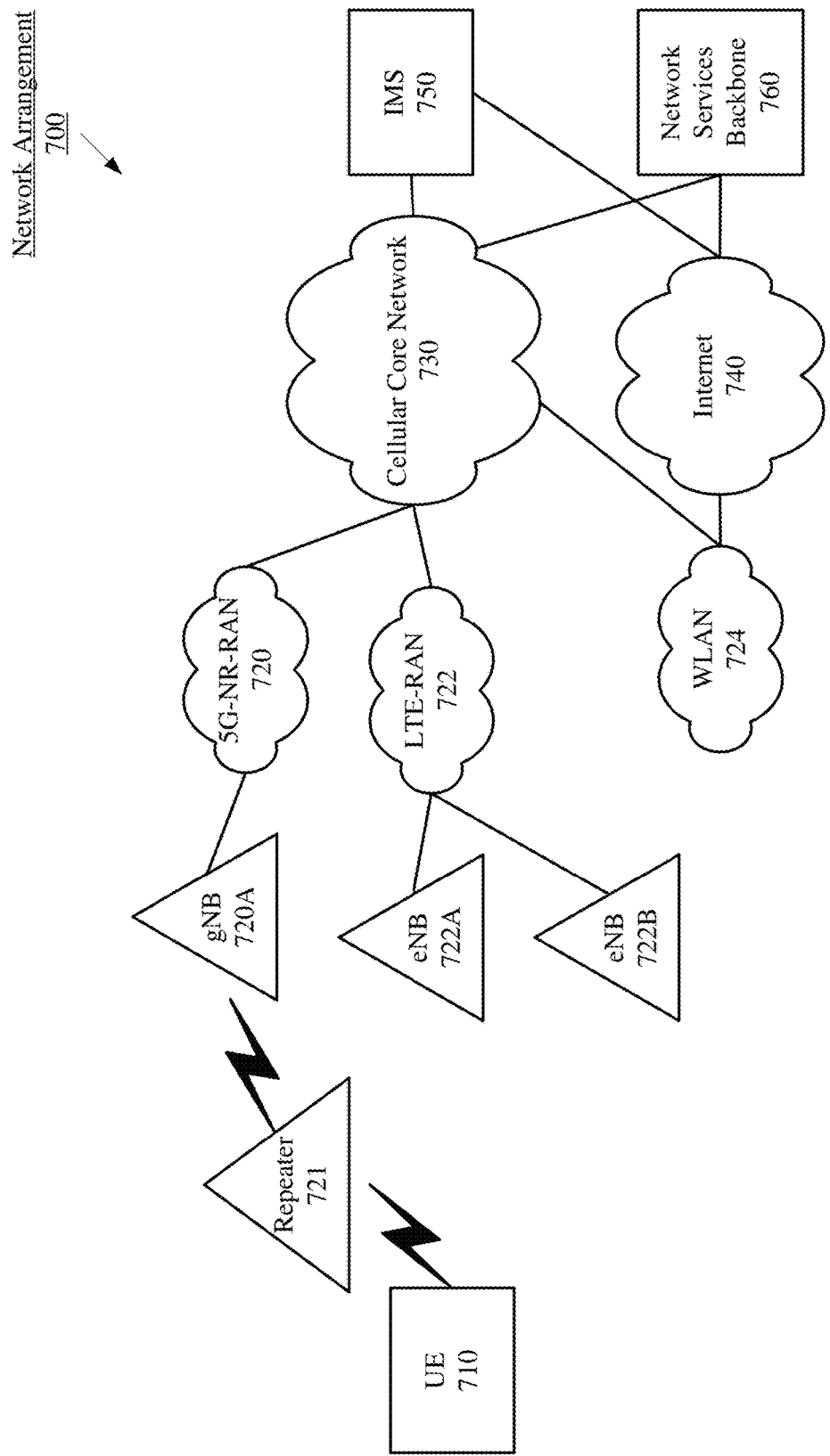
FIG. 7 shows an exemplary network arrangement according to various exemplary embodiments.

FIG. 7 shows an exemplary network arrangement 700 according to various exemplary embodiments. The exemplary network arrangement 700 includes UE 710. Those skilled in the art will understand that the UE 710 may be any type of electronic component that is configured to communicate via a network, e.g., mobile phones, tablet computers, desktop computers, smartphones, phablets, embedded devices, wearables (e.g., HMD, AR glasses, etc.), Internet of Things (IoT) devices, etc. It should also be understood that an actual network arrangement may include any number of UEs being used by any number of users. Thus, the example of one UE 710 is merely provided for illustrative purposes.

The UE 710 may communicate directly with one or more networks. In the example of the network configuration 700, the networks with which the UE 710 may wirelessly communicate are a 5G NR radio access network (5G NR-RAN) 720, an LTE radio access network (LTE-RAN) 722 and a wireless local access network (WLAN) 724. However, the UE 710 may also communicate with other types of networks and the UE 710 may also communicate with networks over a wired connection. Therefore, the UE 710 may include a 5G NR chipset to communicate UE 710 with the 5G NR-RAN 720, an LTE chipset to communicate with the LTE-RAN 722 and an ISM chipset to communicate with the WLAN 724.

The 5G NR-RAN 720 and the LTE-RAN 722 may be portions of cellular networks that may be deployed by a network carrier (e.g., Verizon, AT&T, T-Mobile, etc.). These networks 720, 722 may include, for example, cells or base stations (Node Bs, eNodeBs, HeNBs, eNBS, gNBs, gNodeBs, macrocells, microcells, small cells, femtocells, etc.) that are configured to send and receive traffic from UEs that are equipped with the appropriate cellular chip set. The WLAN 724 may include any type of wireless local area network (WiFi, Hot Spot, IEEE 802.11x networks, etc.).

The UE 710 may connect to the 5G NR-RAN via the gNB 720A. Reference to one gNBs 720A is merely for illustrative purposes. The exemplary embodiments may apply to any appropriate number of gNBs. The UE 710 may also connect to the LTE-RAN 722 via the eNBs 722A, 722B. Those skilled in the art will understand that any association procedure may be performed for the UE 710 to connect to the 5G NR-RAN 720 and the LTE-RAN 722. For example, as discussed above, the 5G NR-RAN 720 and the LTE-RAN 722 may be associated with a particular cellular provider where the UE 710 and/or the user thereof has a contract and credential information (e.g., stored on a SIM card). Upon detecting the presence of the 5G NR-RAN 720, the UE 710 may transmit the corresponding credential information to associate with the 5G NR-RAN 720. More specifically, the UE 710 may associate with a specific base station (e.g., the gNB 720A of the 5G NR-RAN 720, the eNB 722A of the LTE-RAN 722).

In some scenarios, a UE, e.g., the UE 710, may not have a direct connection with a cell and may use a repeater, e.g., the repeater 721, as a relay to forward data/signals to/from the UE 710 and/or the 5G NR-RAN 720. The repeater 721 may be used for relay assistance to forward data/signals between the 5G NR-RAN 720 and the remote UE 510 that is out of range of the network and/or has poor network coverage.

In addition to the networks 720, 722 and 724 the network arrangement 700 also includes a cellular core network 730, the Internet 740, an IP Multimedia Subsystem (IMS) 750, and a network services backbone 760. The cellular core network 730 may be considered to be the interconnected set of components that manages the operation and traffic of the cellular network. The cellular core network 730 also manages the traffic that flows between the cellular network and the Internet 740. The IMS 750 may be generally described as an architecture for delivering multimedia services to the UE 710 using the IP protocol. The IMS 750 may communicate with the cellular core network 730 and the Internet 740 to provide the multimedia services to the UE 710. The network services backbone 760 is in communication either directly or indirectly with the Internet 740 and the cellular core network 730. The network services backbone 760 may be generally described as a set of components (e.g., servers, network storage arrangements, etc.) that implement a suite of services that may be used to extend the functionalities of the UE 710 in communication with the various networks.

Figure 8:
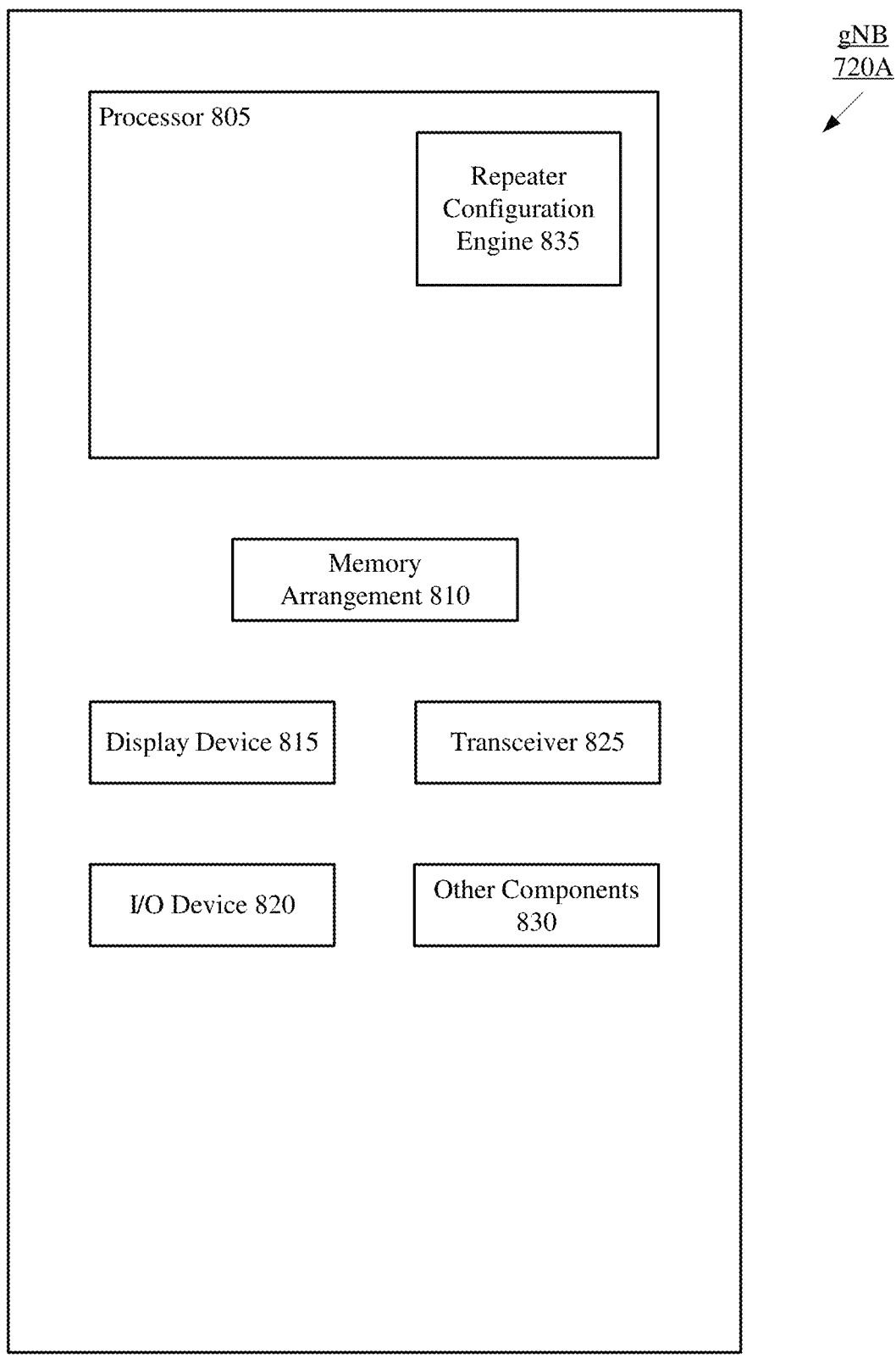
FIG. 8 shows an exemplary base station according to various exemplary embodiments.

FIG. 8 shows an exemplary base station 720A according to various exemplary embodiments. The base station 720A will be described with regard to the network arrangement 700 of FIG. 7. The base station 720A may represent any access node through which the UE 710 may establish a connection and manage network operations. The base station 720A may also establish a connection with the repeater 721 for relay assistance. The base station 720A may also represent the gNB 106 described above with respect to FIG. 1.

The base station 720A may include a processor 805, a memory arrangement 810, an input/output (I/O) device 815, a transceiver 820, and other components 825. The other components 825 may include, for example, a battery, a data acquisition device, ports to electrically connect the base station 720A to other electronic devices, etc.

The processor 805 may be configured to execute a plurality of engines of the base station 720A. For example, the engines may include a repeater configuration engine 830 for performing various operations related to configuring a repeater for beam steering functionalities on an access link with a UE, as described above.

The above noted engine 830 being an application (e.g., a program) executed by the processor 805 is only exemplary. The functionality associated with the engine 830 may also be represented as a separate incorporated component of the base station 720A or may be a modular component coupled to the base station 720A, e.g., an integrated circuit with or without firmware. For example, the integrated circuit may include input circuitry to receive signals and processing circuitry to process the signals and other information. In addition, in some base stations, the functionality described for the processor 805 is split among a plurality of processors (e.g., a baseband processor, an applications processor, etc.). The exemplary embodiments may be implemented in any of these or other configurations of a base station.

The memory 810 may be a hardware component configured to store data related to operations performed by the base station 800. The I/O device 815 may be a hardware component or ports that enable a user to interact with the base station 800. The transceiver 820 may be a hardware component configured to exchange data with the UE 710 and any other UE in the system 700. The transceiver 820 may operate on a variety of different frequencies or channels (e.g., set of consecutive frequencies). Therefore, the transceiver 820 may include one or more components (e.g., radios) to enable the data exchange with the various networks and UEs.

Figure 9:
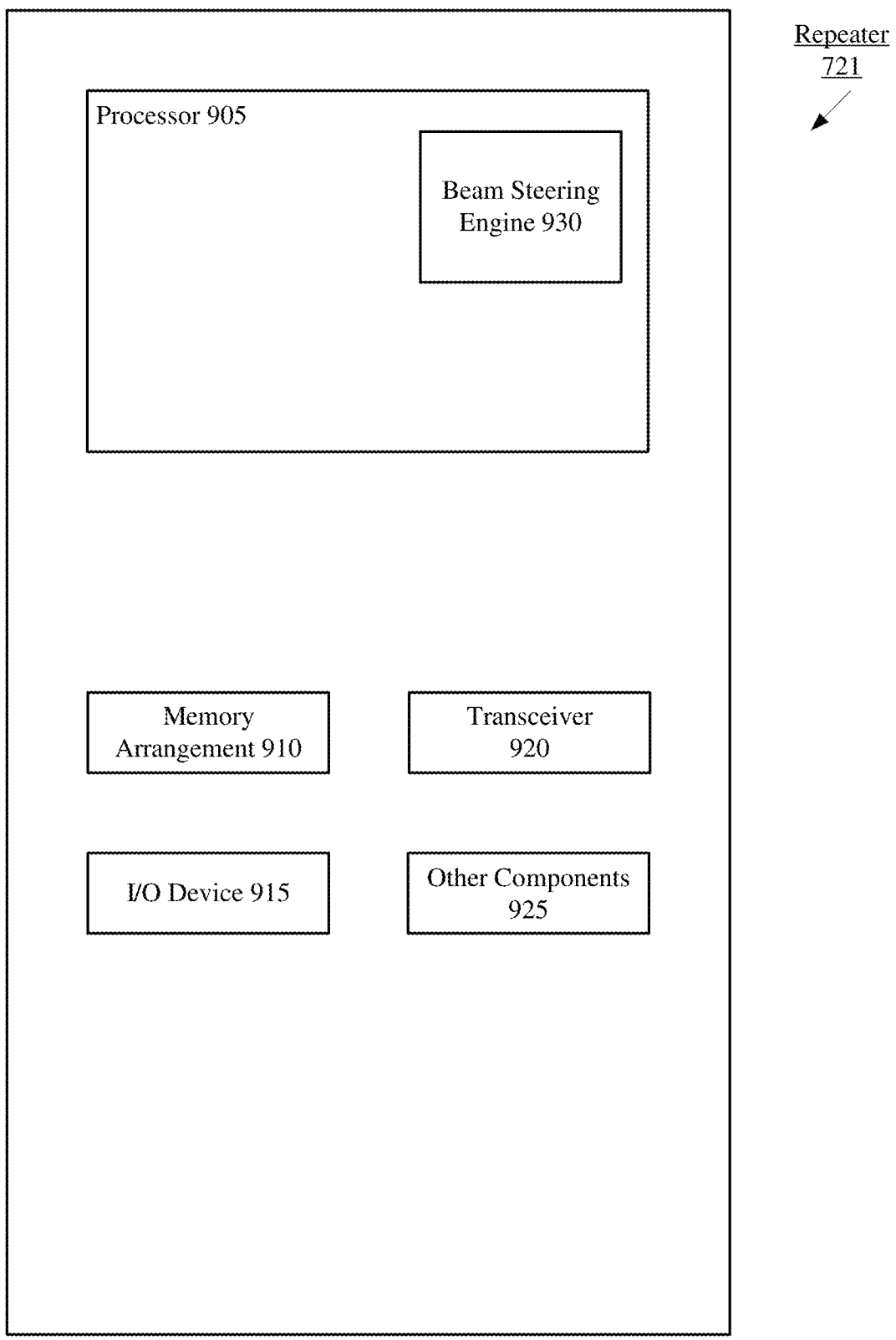
FIG. 9 shows an exemplary repeater according to various exemplary embodiments.

FIG. 9 shows an exemplary repeater 721 according to various exemplary embodiments. The repeater 721 will be described with regard to the network arrangement 700 of FIG. 7. The repeater 721 may represent a relay node through which the UE 710 may transmit/receive transmissions to/from the network 700. The repeater 721 may also represent the repeater 104 described above with respect to FIG. 1.

The repeater 721 may include a processor 905, a memory arrangement 910, an input/output (I/O) device 915, a transceiver 920, and other components 925. The other components 925 may include, for example, a battery, a data acquisition device, ports to electrically connect the repeater 721 to other electronic devices, etc.

The processor 905 may be configured to execute a plurality of engines of the repeater 721. For example, the engines may include a beam steering engine 930 for performing various operations related to transmitting or receiving a directional beam to or from a UE, as described above.

The above noted engine 930 being an application (e.g., a program) executed by the processor 905 is only exemplary. The functionality associated with the engine 930 may also be represented as a separate incorporated component of the repeater 721 or may be a modular component coupled to the repeater 721, e.g., an integrated circuit with or without firmware. For example, the integrated circuit may include input circuitry to receive signals and processing circuitry to process the signals and other information. The exemplary embodiments may be implemented in any of these or other configurations of a repeater.

The memory 910 may be a hardware component configured to store data related to operations performed by the repeater 721. The I/O device 915 may be a hardware component or ports that enable a user to interact with the repeater 721. The transceiver 920 may be a hardware component configured to exchange data with the UE 710 and any other UE in the system 700. The transceiver 920 may operate on a variety of different frequencies or channels (e.g., set of consecutive frequencies). Therefore, the transceiver 920 may include one or more components (e.g., radios) to enable the data exchange with the various networks and UEs.

EXAMPLES

In a first example, a processor of a repeater is configured to receive, on a side control channel from a component of a network, side control information including parameters at least for determining time domain resources on which to apply an indicated beam for uplink (UL) transmission reception or downlink (DL) transmission forwarding with a user equipment (UE) on an access link, determine, from the received parameters, whether to apply the indicated beam to a transmission (Tx) spatial filter, a reception (Rx) spatial filter, or both the Tx and Rx spatial filters and apply the indicated beam to the determined Tx spatial filter, Rx spatial filter, or both the Tx and Rx spatial filters for the determined time domain resources when forwarding the DL transmission to the UE or receiving the UL transmission from the UE for forwarding to the network.

In a second example, the processor of the first example, wherein the parameters include a slot offset for determining a slot, a starting symbol, and a duration.

In a third example, the processor of the second example, wherein the slot offset is relative to a slot index in which the side control information is received.

In a fourth example, the processor of the third example, wherein the parameters further include a numerology for the access link, a DL-UL time domain duplexing (TDD) configuration for which the determined time domain resources are applied, and a beam forming indication for the access link.

In a fifth example, the processor of the fourth example, wherein the beam forming indication comprises a transmission configuration indicator (TCI) state.

In a sixth example, the processor of the fifth example, wherein the starting symbol is determined within the determined slot according to $$\left\lfloor n \cdot \frac{2^{\mu_1}}{2^{\mu_2}} \right\rfloor + SlotOffset,$$

where n is the slot index in which the side control information is received, $\mu_1$ is a first numerology for a backhaul link between the network component and the repeater, and $\mu_2$ is a second numerology for the access link.

In a seventh example, the processor of the sixth example, wherein the second numerology is expected to have a same value as the first numerology.

In an eighth example, the processor of the sixth example, wherein the first numerology is different from the second numerology.

In a ninth example, the processor of the fourth example, wherein the DL-UL TDD configuration indicates a pattern comprising a number of UL symbols and a number of DL symbols in a given slot.

In a tenth example, the processor of the ninth example, wherein the side control information further includes a codepoint indication of whether to apply the indicated beam to the Tx spatial filter, the Rx spatial filter, or both the Tx and Rx spatial filters.

In an eleventh example, the processor of the tenth example, wherein a first codepoint indicates the Tx spatial filter, a second codepoint indicates the Rx spatial filter, and a third codepoint indicates the Tx and Rx spatial filters.

In a twelfth example, the processor of the eleventh example, wherein, when the Tx spatial filter is indicated, the indicated beam is used to forward any one of a physical downlink control channel (PDCCH), a physical downlink shared channel (PDSCH), or a DL reference signal (RS).

In a thirteenth example, the processor of the eleventh example, wherein, when the Rx spatial filter is indicated, the indicated beam is used to receive any one of a physical uplink control channel (PUCCH), a physical uplink shared channel (PUSCH), or a UL reference signal (RS).

In a fourteenth example, the processor of the tenth example, wherein, when the Tx spatial filter is not indicated, the DL symbols in the given slot are assumed to be vacant and the beam is not applied and wherein, when the Rx spatial filter is not indicated, the UL symbols in the given slot are assumed to be vacant and the beam is not applied.

In a fifteenth example, the processor of the ninth example, further configured to determine whether to apply the indicated beam to the Tx spatial filter, the Rx spatial filter, or both the Tx and Rx spatial filters based on the starting symbol of the determined time domain resources being either a DL symbol or a UL symbol in the UL-DL TDD pattern.

In a sixteenth example, the processor of the fifteenth example, wherein, the repeater is expected to apply the indicated beam for all the DL symbols or all the UL symbols over the determined duration.

In a seventeenth example, the processor of the fourth example, wherein the time domain resources and the TCI state are jointly indicated by a single codepoint.

In an eighteenth example, the processor of the fourth example, wherein the time domain resources and the TCI state are separately indicated by a time domain resource allocation (TDRA) table and a TCI table, respectively.

In a nineteenth example, the processor of the first example, further configured to indicate a capability of beam correspondence wherein the repeater can apply a same beam for both the Tx spatial filter and the Rx spatial filter.

In a twentieth example, the processor of the nineteenth example, wherein, when the beam correspondence capability is indicated, the repeater assumes to apply the same beam for both the DL and the UL.

In a twenty first example, the processor of the first example, further configured to indicate one or more additional capabilities including whether a time offset is required by the repeater for receiving and forwarding; whether a time offset is required by the repeater for switching between forwarding to the UE and receiving from the UE; or whether a time offset is required by the repeater to switch from a first beam to a second beam, where both beams are indicated for a same DL or UL direction.

In a twenty second example, the processor of the twenty first example, wherein, when the one or more additional capabilities are indicated by the repeater, the repeater expects to receive time domain resource parameters that comply with the reported capabilities.

In a twenty third example, the processor of the first example, further configured to receive an indication of multiple numerologies corresponding to different UEs, wherein a reference numerology is applied to determine the time domain resources and corresponding beams and the reference numerology equals a maximum value from the indicated multiple numerologies.

In a twenty fourth example, the processor of the first example, wherein the received parameters further include an additional time offset value.

In a twenty fifth example, the processor of the first example, wherein the time domain resources are periodic or semi-persistent.

In a twenty sixth example, the processor of the first example, wherein the time domain resources are used to indicate a starting time and duration for turning ON or OFF the access link or backhaul link.

In a twenty seventh example, the processor of the first example, wherein the time domain resources are used to determine beam parameters for a backhaul link.

In a twenty eighth example, a repeater comprises a transceiver configured to communicate with a user equipment (UE) and a network and a processor communicatively coupled to the transceiver and configured to perform any of the operations of the first through twenty seventh examples.

In a twenty ninth example, a method to perform any of the operations of the first through twenty seventh examples.

In a thirtieth example, a processor of a repeater is configured to receive, on a side control channel from a component of a network, side control information including parameters at least for determining first time domain resources on which to apply a first indicated beam and second time domain resources on which to apply a second indicated beam for uplink (UL) transmission reception or downlink (DL) transmission forwarding with a user equipment (UE) on an access link, determine, from the received parameters, whether to apply the first or second indicated beams to a transmission (Tx) spatial filter, a reception (Rx) spatial filter, or both the Tx and Rx spatial filters and apply the first or second indicated beams to the determined Tx spatial filter, Rx spatial filter, or both the Tx and Rx spatial filters for the determined first or second time domain resources when forwarding the DL transmission to the UE or receiving the UL transmission from the UE for forwarding to the network.

In a thirty first example, the processor of the thirtieth example, further configured to receive or determine a first set of configuration including a first numerology and a first UL-DL time domain duplexing (TDD) configuration for a backhaul link between the network component and the repeater and a second set of configuration including a second numerology and a second UL-DL TDD configuration for the access link.

In a thirty second example, the processor of the thirty first example, wherein the first UL-DL TDD configuration is a static configuration for a given cell and the second UL-DL TDD configuration is a semi-static or dynamic configuration that can override the first UL-DL TDD configuration for the given cell.

In a thirty third example, the processor of the thirty first example, wherein the second numerology is assumed to be equal to the first numerology.

In a thirty fourth example, the processor of the thirty first example, wherein the second numerology is configured for the repeater when a corresponding DL or UL bandwidth part (BWP) for the UE is configured with a numerology different from the first numerology.

In a thirty fifth example, the processor of the thirty first example, wherein the first numerology is a reference numerology that is smaller than or equal to the second numerology.

In a thirty sixth example, the processor of the thirty first example, wherein the parameters include a first slot offset for determining a first slot, a first starting symbol, and a first duration for the first time domain resources and a second slot offset for determining a second slot, a second starting symbol, and a second duration for the second time domain resources.

In a thirty seventh example, the processor of the thirty sixth example, wherein the first slot offset is relative to a slot index in which the side control information is received and the second slot offset is relative to the first slot.

In a thirty eighth example, the processor of the thirty sixth example, wherein the first and second slot offsets are relative to a slot index in which the side control information is received.

In a thirty ninth example, the processor of the thirty first example, wherein the first and second beam forming indications comprise respective transmission configuration indicator (TCI) states.

In a fortieth example, the processor of the thirty ninth example, wherein the respective TCI states are indicated jointly for each of the first and second time domain resources.

In a forty first example, the processor of the thirty ninth example, wherein the respective TCI states are separately indicated by a time domain resource allocation (TDRA) table and a TCI table, respectively.

In a forty second example, the processor of the thirty ninth example, wherein the second UL-DL TDD configuration indicates a pattern comprising a number of UL symbols and a number of DL symbols in a given slot.

In a forty third example, the processor of the forty second example, wherein the side control information further includes respective codepoint indications of whether to apply the respective indicated beams to the Tx spatial filter, the Rx spatial filter, or both the Tx and Rx spatial filters, or determining whether to apply the respective indicated beams to the Tx spatial filter, the Rx spatial filter, or both the Tx and Rx spatial filters based on the starting symbol of the determined time domain resources being either a DL symbol or a UL symbol in the UL-DL TDD pattern.

In a forty fourth example, the processor of the forty third example, wherein the respective first and second time domain resources are expected to be non-overlapping in time and occur in sequential manner.

In a forty fifth example, the processor of the forty third example, wherein the respective first and second time domain resources are partially or fully overlapping in time.

In a forty sixth example, the processor of the forty fifth example, wherein the repeater is capable of simultaneous Tx or simultaneous Rx using different beams for the access link.

In a forty seventh example, the processor of the forty second example, wherein the parameters include a single set of time domain resource parameters and the first and second time domain resources fully overlap, wherein the repeater simultaneously receives UL transmissions from the UE or simultaneously transmits DL transmissions to the UE on the first and second indicated beams.

In a forty eighth example, the processor of the forty seventh example, further configured to indicate a capability of simultaneous Tx or simultaneous Rx on multiple beams.

In a forty ninth example, the processor of the thirtieth example, further configured to indicate one or more additional capabilities including whether a time offset is required by the repeater for receiving and forwarding; whether a time offset is required by the repeater for switching between forwarding to the UE and receiving from the UE; or whether a time offset is required by the repeater to switch from a first beam to a second beam, where both beams are indicated for a same DL or UL direction.

In a fiftieth example, the processor of the forty ninth example, wherein, when the one or more additional capabilities are indicated by the repeater, the repeater expects to receive time domain resource parameters that comply with the reported capabilities.

In a fifty first example, the processor of the thirtieth example, further configured to receive an indication of multiple numerologies corresponding to different UEs, wherein a reference numerology is applied to determine the time domain resources and corresponding beams and the reference numerology equals a maximum value from the indicated multiple numerologies.

In a fifty second example, the processor of the thirtieth example, wherein the received parameters further include an additional time offset value.

In a fifty third example, the processor of the thirtieth example, wherein the time domain resources are periodic or semi-persistent.

In a fifty fourth example, the processor of the thirtieth example, wherein the time domain resources are used to indicate a starting time and duration for turning ON or OFF the access link or backhaul link.

In a fifty fifth example, the processor of the thirtieth example, wherein the time domain resources are used to determine beam parameters for a backhaul link.

In a fifty sixth example, a repeater comprises a transceiver configured to communicate with a user equipment (UE) and a network and a processor communicatively coupled to the transceiver and configured to perform any of the operations of the thirtieth through fifty fifth examples.

In a fifty seventh example, a method to perform any of the operations of the thirtieth through fifty fifth examples.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. In a further example, the exemplary embodiments of the above described method may be embodied as a program containing lines of code stored on a non-transitory computer readable storage medium that, when compiled, may be executed on a processor or microprocessor.

Although this application described various embodiments each having different features in various combinations, those skilled in the art will understand that any of the features of one embodiment may be combined with the features of the other embodiments in any manner not specifically disclaimed or which is not functionally or logically inconsistent with the operation of the device or the stated functions of the disclosed embodiments.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalents.

The invention claimed is:

1. A processor of a repeater configured to:
   receive, on a side control channel from a component of a network, side control information including parameters at least for determining time domain resources on which to apply an indicated beam for uplink (UL) transmission reception or downlink (DL) transmission forwarding with a user equipment (UE) on an access link;
   determine, from the received parameters, whether to apply the indicated beam to a transmission (Tx) spatial filter, a reception (Rx) spatial filter, or both the Tx and Rx spatial filters; and
   apply the indicated beam to the determined Tx spatial filter, Rx spatial filter, or both the Tx and Rx spatial filters for the determined time domain resources when forwarding the DL transmission to the UE or receiving the UL transmission from the UE for forwarding to the network.

2. The processor of claim 1, wherein the parameters include a slot offset for determining a slot, a starting symbol, and a duration.

3. The processor of claim 2, wherein the slot offset is relative to a slot index in which the side control information is received.

4. The processor of claim 3, wherein the parameters further include a numerology for the access link, a DL-UL time domain duplexing (TDD) configuration for which the determined time domain resources are applied, and a beam forming indication for the access link.

5. The processor of claim 4, wherein the DL-UL TDD configuration indicates a pattern comprising a number of UL symbols and a number of DL symbols in a given slot.

6. The processor of claim 4, wherein the time domain resources and the TCI state are jointly indicated by a single codepoint.

7. The processor of claim 4, wherein the time domain resources and the TCI state are separately indicated by a time domain resource allocation (TDRA) table and a TCI table, respectively.

8. The processor of claim 1, further configured to:
   indicate a capability of beam correspondence wherein the repeater applies a same beam for both the Tx spatial filter and the Rx spatial filter.

9. The processor of claim 1, further configured to:
   indicate one or more additional capabilities including whether a time offset is required by the repeater for receiving and forwarding; whether a time offset is required by the repeater for switching between forwarding to the UE and receiving from the UE; or whether a time offset is required by the repeater to switch from a first beam to a second beam, where both beams are indicated for a same DL or UL direction.

10. The processor of claim 1, further configured to:
    receive an indication of multiple numerologies corresponding to different UEs, wherein a reference numerology is applied to determine the time domain resources and corresponding beams and the reference numerology equals a maximum value from the indicated multiple numerologies.

11. A processor of a repeater configured to:
    receive, on a side control channel from a component of a network, side control information including parameters at least for determining first time domain resources on which to apply a first indicated beam and second time domain resources on which to apply a second indicated beam for uplink (UL) transmission reception or downlink (DL) transmission forwarding with a user equipment (UE) on an access link;
    determine, from the received parameters, whether to apply the first or second indicated beams to a transmission (Tx) spatial filter, a reception (Rx) spatial filter, or both the Tx and Rx spatial filters; and
    apply the first or second indicated beams to the determined Tx spatial filter, Rx spatial filter, or both the Tx and Rx spatial filters for the determined first or second time domain resources when forwarding the DL transmission to the UE or receiving the UL transmission from the UE for forwarding to the network.

12. The processor of claim 11, further configured to:
    receive or determine a first set of configuration including a first numerology and a first UL-DL time domain duplexing (TDD) configuration for a backhaul link between the network component and the repeater and a second set of configuration including a second numerology and a second UL-DL TDD configuration for the access link.

13. The processor of claim 12, wherein the first and second beam forming indications comprise respective transmission configuration indicator (TCI) states.

14. The processor of claim 11, wherein the second UL-DL TDD configuration indicates a pattern comprising a number of UL symbols and a number of DL symbols in a given slot.

15. The processor of claim 14, wherein the side control information further includes respective codepoint indications of whether to apply the respective indicated beams to the Tx spatial filter, the Rx spatial filter, or both the Tx and Rx spatial filters, or determining whether to apply the respective indicated beams to the Tx spatial filter, the Rx spatial filter, or both the Tx and Rx spatial filters based on a starting symbol of the determined time domain resources being either a DL symbol or a UL symbol in the UL-DL TDD pattern.

16. The processor of claim 15, wherein the respective first and second time domain resources are expected to be non-overlapping in time and occur in sequential manner.

17. The processor of claim 15, wherein the respective first and second time domain resources are partially or fully overlapping in time.

18. The processor of claim 17, wherein the repeater is capable of simultaneous Tx or simultaneous Rx using different beams for the access link.

19. The processor of claim 14, wherein the parameters include a single set of time domain resource parameters and the first and second time domain resources fully overlap, wherein the repeater simultaneously receives UL transmissions from the UE or simultaneously transmits DL transmissions to the UE on the first and second indicated beams.

20. The processor of claim 19, further configured to:
   indicate a capability of simultaneous Tx or simultaneous Rx on multiple beams.

* * * * *